United States Patent
Ecrabey et al.

(10) Patent No.: US 9,036,389 B2
(45) Date of Patent: May 19, 2015

(54) SECURE CONTROL MECHANISM FOR DISTRIBUTED PHOTOVOLTAIC SYSTEM

(75) Inventors: Jacques Ecrabey, Guilherand Granges (FR); Christian Petit, Vif (FR); Yves Jeanjean, Domene (FR); Antonio Almeida, Voreppe (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 263 days.

(21) Appl. No.: 13/475,101

(22) Filed: May 18, 2012

(65) Prior Publication Data

US 2012/0319494 A1 Dec. 20, 2012

(30) Foreign Application Priority Data

Jun. 15, 2011 (FR) .................................. 11 55190

(51) Int. Cl.
| | | |
|---|---|---|
| H02M 7/537 | (2006.01) | |
| H02M 5/458 | (2006.01) | |
| H02J 1/10 | (2006.01) | |
| H02J 3/38 | (2006.01) | |

(52) U.S. Cl.
CPC ................. H02J 1/102 (2013.01); H02J 3/383 (2013.01); H02J 3/385 (2013.01); *Y02E 10/563* (2013.01); *Y02E 10/58* (2013.01)

(58) Field of Classification Search
CPC .......................... H02M 2001/007; H02J 2/383
USPC ................... 363/34–40, 65, 95–98, 131–132; 323/906
See application file for complete search history.

(56) References Cited

U.S. PATENT DOCUMENTS

| | | | | |
|---|---|---|---|---|
| 4,328,429 | A * | 5/1982 | Kublick | 307/58 |
| 4,521,688 | A * | 6/1985 | Yin | 250/363.04 |
| 5,668,713 | A * | 9/1997 | Eguchi et al. | 363/95 |
| 5,856,712 | A * | 1/1999 | Suzuki et al. | 307/64 |
| 6,750,391 | B2 * | 6/2004 | Bower et al. | 136/244 |
| 7,672,149 | B2 * | 3/2010 | Falk | 363/98 |
| 7,855,906 | B2 * | 12/2010 | Klodowski et al. | 363/97 |
| 8,259,479 | B2 * | 9/2012 | Wagoner et al. | 363/97 |
| 8,362,648 | B2 * | 1/2013 | Matsui et al. | 307/75 |
| 8,537,581 | B2 * | 9/2013 | Wagoner et al. | 363/95 |
| 2004/0159102 | A1 | 8/2004 | Toyomura et al. | |
| 2007/0138792 | A1 * | 6/2007 | Liu et al. | 290/1 A |

(Continued)

OTHER PUBLICATIONS

French Preliminary Search Report and Written Opinion issued Jan. 20, 2012, in French 1155190, filed Jun. 15, 2011 (with English Translation of Categories of Cited Documents).

*Primary Examiner* — Timothy J Dole
*Assistant Examiner* — Yusef Ahmed
(74) *Attorney, Agent, or Firm* — Oblon, McClelland, Maier & Neustadt, L.L.P.

(57) ABSTRACT

A system for controlling photovoltaic electricity production equipment having photovoltaic modules each equipped with a DC/DC microconverter connected to a DC bus, a DC bus manager, and an inverter for converting the direct current from the photovoltaic panels into alternative current intended for an electrical distribution network. Power is injected into the DC bus when the voltage of the DC bus is less than a minimum voltage until the minimum voltage is reached. Each of the microconverters injects a maximum power from the photovoltaic modules into the DC bus when the voltage of the DC bus is between a first voltage and a second voltage. The injecting of power from the photovoltaic modules into the DC bus is stopped when the voltage of the DC bus is less than a low threshold voltage or greater than a high threshold voltage.

8 Claims, 4 Drawing Sheets

(56) References Cited

U.S. PATENT DOCUMENTS

| | | |
|---|---|---|
| 2007/0164612 A1* | 7/2007 | Wendt et al. .................... 307/45 |
| 2007/0217239 A1* | 9/2007 | Rottger et al. ................ 363/131 |
| 2009/0121549 A1 | 5/2009 | Leonard |
| 2009/0179500 A1* | 7/2009 | Ragonese et al. ............... 307/82 |
| 2010/0001587 A1* | 1/2010 | Casey et al. .................... 307/80 |
| 2010/0133911 A1* | 6/2010 | Williams et al. ................ 307/82 |
| 2010/0157638 A1* | 6/2010 | Naiknaware et al. ......... 363/131 |
| 2010/0253148 A1* | 10/2010 | Matsui et al. .................... 307/75 |
| 2011/0096579 A1* | 4/2011 | Klodowski et al. ............ 363/132 |
| 2012/0019074 A1* | 1/2012 | Frolov et al. ..................... 307/82 |
| 2012/0033466 A1* | 2/2012 | Moussaoui ...................... 363/65 |
| 2012/0081937 A1* | 4/2012 | Phadke ............................ 363/95 |
| 2012/0127764 A1* | 5/2012 | Phadke et al. .................. 363/37 |
| 2013/0027998 A1* | 1/2013 | Esram et al. ..................... 363/98 |
| 2013/0107587 A1* | 5/2013 | Xu et al. ......................... 363/37 |
| 2013/0107594 A1* | 5/2013 | Wagoner et al. ................. 363/97 |
| 2014/0056041 A1* | 2/2014 | Zhu et al. ................... 363/56.01 |

* cited by examiner

SECURE CONTROL MECHANISM FOR DISTRIBUTED PHOTOVOLTAIC SYSTEM

TECHNICAL FIELD OF THE INVENTION

The present invention relates to a system for managing the control of a photovoltaic electricity production plant. More specifically, the invention proposes a control and safety mechanism for photovoltaic electricity production equipment, the said mechanism not requiring any integrated communication system for its various components to communicate with each other.

PRIOR ART

In a known way, a photovoltaic generator is composed of photovoltaic panels and an inverter. The inverter provides for converting the direct current from the photovoltaic panels into alternative current intended for an electrical distribution network.

To form a photovoltaic electricity production plant, the photovoltaic panels are connected in series to increase the voltage and to form strings of photovoltaic panels, the said strings being connected in parallel to increase power and form groups. Several groups can be connected in parallel at the input of an inverter to form a photovoltaic generator.

This mode of organisation of a photovoltaic plant exhibits various constraints. First of all, any shade on a photovoltaic panel, due to a tree, a wall etc, will modify the electrical characteristics and reduce the production of the string in which the shaded panel is included. This string will disturb the other strings in the group in which it is included, since the balance of voltages is no longer ensured. Dirt on the photovoltaic cells forming the panels can also lead to this type of behaviour.

Moreover, the photovoltaic modules forming such a photovoltaic generator must always have identical characteristics. Any mismatch in characteristics of the photovoltaic modules used can also lead to a reduction in the productivity of a generator, although to a lesser extent.

Another drawback lies in the fact that voltage is always present on the DC bus supplied by the photovoltaic panels, even if the inverter stops or in the event of disconnection from the electrical distribution network, since the voltage is set by the photovoltaic strings or groups. This gives rise to an electrical safety issue, for example when emergency teams operate on the plant.

With the aim of overcoming these constraints, one idea consists in combining power converters with the photovoltaic modules. By means of these converters, it appears in effect possible to reduce the impact of one photovoltaic module on the productivity of the other modules of a generator.

In the prior art, photovoltaic generators comprising power converters have been developed. These solutions are, in particular, described in patent application US2009/0150005. This document describes a photovoltaic generator implementing the DC/DC power converters integrated in the photovoltaic panels, and connected in parallel to the DC bus supplied by the said panels. According to this technology, an additional central module is used to drive the whole plant via a communication network integrated in the power bus supplied by the photovoltaic panels. The publication of patent application US2009/0150005 describes the control of photovoltaic modules via the said communication network.

Another known technology relies on the use of DC/DC power converters to raise the voltage of the photovoltaic panels to the voltage of the bus supplied by the said panels and regulated by the inverter, for example between 250 V and 340 V. Each photovoltaic module communicates via carrier current with the aid of a communication module in order to transmit electrical values and to receive startup or stoppage instructions according to conditions. Patent application WO 2009/082708 thus discloses the use of integrated communication networks, communicating by carrier current or wirelessly, for controlling power converters of a photovoltaic generator.

The major drawback of all these distributed architectures of known photovoltaic systems lies in the complexity of the electronics integrated in the photovoltaic panels, which leads to an unfavourable probability of failure on power production. The systems belonging to the prior art and described above are dependent on the correct operation of their integrated communication system, since it is this system that authorizes the production of power. Electronic components required for this function are therefore critical for the system and contribute to degrading the availability and productivity of the photovoltaic power generation system.

The aim of the invention is therefore to propose an alternative solution to the existing technologies, through a system for controlling photovoltaic electricity production equipment having a safe behaviour in all operating phases, without resorting to a communication system.

DESCRIPTION OF THE INVENTION

This aim is achieved by a system for controlling photovoltaic electricity production equipment comprising:
  at least one DC/DC microconverter connected to a DC bus and connected to a photovoltaic module;
  an inverter for converting the direct current from the DC bus into alternative current intended for an electrical distribution network;
  the said at least one microconverter moreover comprising means for independently determining the level of power to inject into the DC bus as a function of the voltage level of the said DC bus, and the said at least one microconverter stopping the injecting of power from the photovoltaic modules into the DC bus when the voltage of the DC bus is less than a low threshold voltage Va or greater than a high threshold voltage Vd; furthermore, the system according to the invention comprises means for managing the DC bus, the said means for managing the DC bus being configured to inject power into the DC bus when the voltage of the said DC bus is less than a minimum voltage Vm until the said minimum voltage Vm is reached, from which level the injecting of power is interrupted.

Advantageously, the said at least one microconverter is configured to:
  inject a maximum of power from the photovoltaic modules into the DC bus when the voltage of the DC bus is between a first voltage Vb and a second voltage Vc;
  stop the injecting of power from the photovoltaic modules into the DC bus when the voltage of the DC bus is less than a low threshold voltage Va or greater than a high threshold voltage Vd;
  where $0<Va<Vm<Vb<Vc<Vd$.

Advantageously, the means for managing the DC bus can be configured such that, when the voltage of the DC bus is greater than a voltage threshold Vs, the said voltage threshold Vs being greater than the second voltage Vc and less than the high threshold voltage Vd, the said device for managing the DC bus triggers a timeout at least equal to twice the inverter startup time and, at the end of the said timeout, starts a procedure for discharging the DC bus by means of a suitable discharge system.

According to one embodiment of the invention, the said means for managing the DC bus are comprised in the inverter.

According to another embodiment of the invention, a specific device for managing the DC bus, distinct from the inverter, and supplied with power, forms the said means for managing the DC bus.

Advantageously, the device for managing the DC bus comprises the said system for discharging the DC bus.

Advantageously, the device for managing the DC bus comprises, moreover, an astronomical clock for starting the device according to the invention only during daylight hours.

Advantageously, the said at least one microconverter is moreover configured to be placed automatically in a standby mode when the voltage of the DC bus is less than the low threshold voltage Va or greater than the high threshold voltage Vd.

BRIEF DESCRIPTION OF THE DRAWINGS

Other features and advantages will become clear in the following detailed description, given with reference to the accompanying drawings which represent.

DETAILED DESCRIPTION OF AT LEAST ONE EMBODIMENT

Figure 1A:
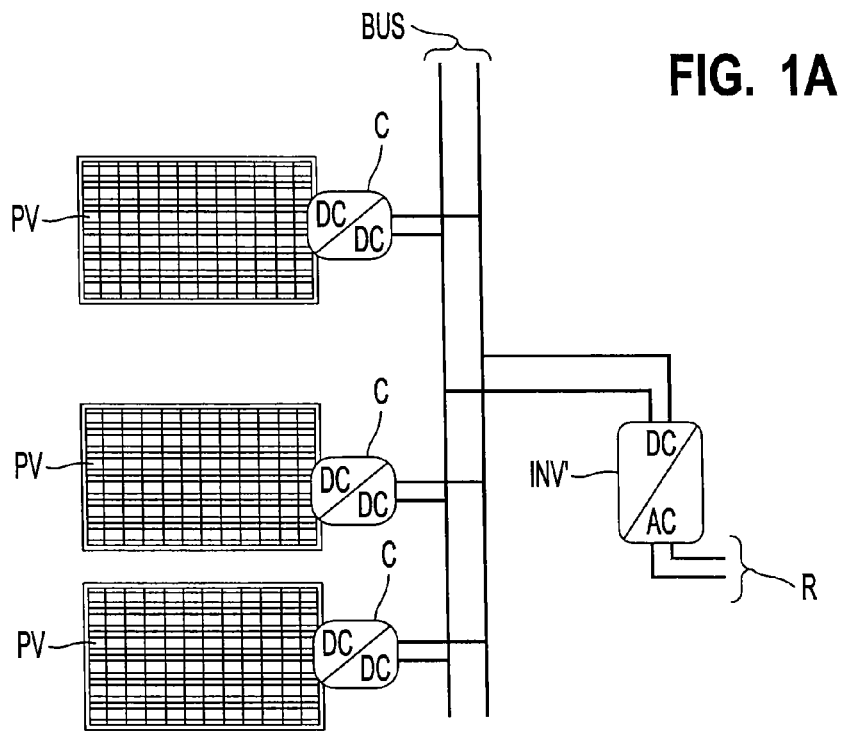
FIG. 1A: a simple diagram representing a first embodiment of the device according to the invention.
Figure 1B:
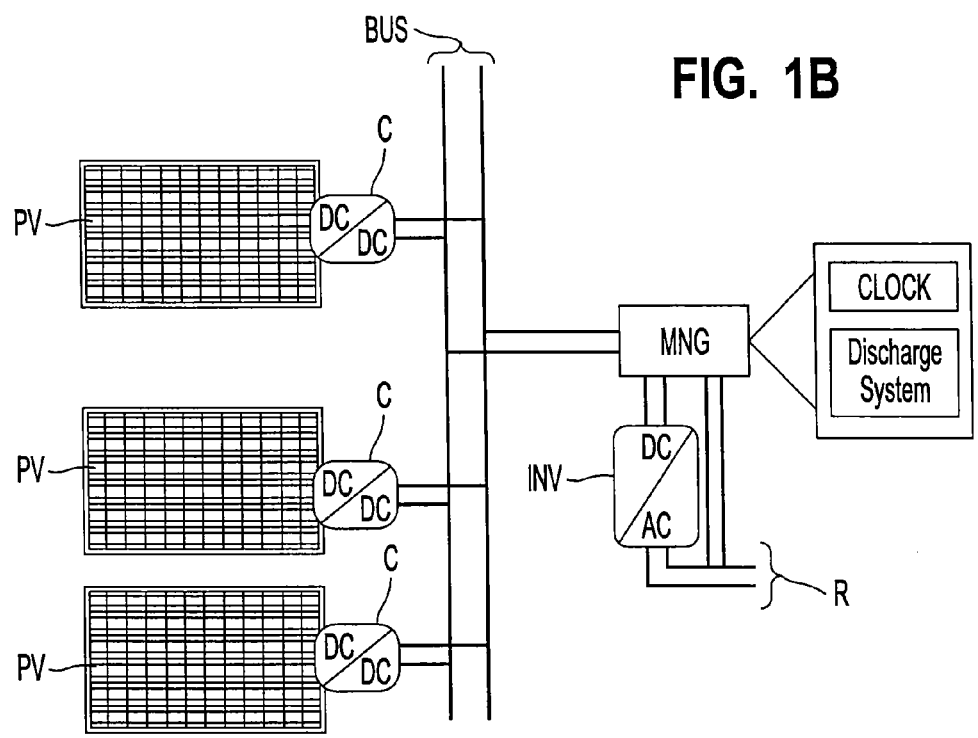
FIG. 1B: a simple diagram representing a second embodiment of the device according to the invention.

FIGS. 1A and 1B represent the two main embodiments of the invention. With each photovoltaic module PV, there is associated a DC/DC boost microconverter C. These microconverters C are connected in parallel and connected to a central inverter INV, INV'.

According to the embodiment of FIG. 1A, the device according to the invention includes a specific optimized inverter INV'.

According to the embodiment of FIG. 1B, the device according to the invention includes a standard inverter INV, associated with a specific module MNG called a "DC bus manager", corresponding to means MNG for managing the DC bus BUS.

In both cases, the specific item—specific inverter INV' or DC bus manager MNG—drives and regulates the DC bus BUS.

The microconverters C operate in current-source mode and draw power from the photovoltaic modules PV in order to supply the power to the inverter INV, INV' which injects it into an electrical distribution network R.

Regarding the principle, one essential feature of the invention lies in the fact that each microconverter C is capable of independently deciding its running mode, only by reading the voltage level on the DC bus BUS, without resorting to any system for communicating with the inverter INV' or with the DC bus manager MNG.

Hereafter in the description, the operation of the particular embodiment of FIG. 1B is described, in which the device according to invention includes a DC bus manager MNG. It is obvious that the operation described hereinafter can be perfectly transposed to the case of FIG. 1A in which a specific inverter INV' comprises means to manage the DC bus BUS.

Figure 2:
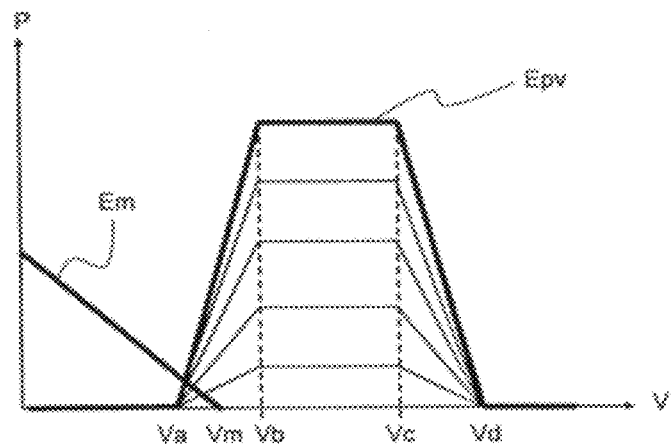
FIG. 2: a diagram representing the power injected into the DC bus of the system, enabling the overall operation of the device according to the invention to be described.

FIG. 2 represents a diagram of the general operation of the device according to the invention. More specifically, FIG. 2 represents a diagram with:

ordinates: the power P injected into the DC bus BUS:
  from the photovoltaic modules PV, via the microconverters C, corresponding to the power Epv on the diagram; or:
  from the DC bus manager MNG, corresponding to the power Em on the diagram,
abscissae: the voltage V of the DC bus BUS.

Thus, the DC bus manager MNG is capable of injecting a low quantity of power into the DC bus BUS as long as its voltage level is low. This power charges the DC bus BUS to a minimum voltage level Vm. When this level is reached, the injecting of power by the DC bus manager MNG is interrupted.

Each microconverter C is programmed to transmit to the DC bus BUS the maximum of power when the bus voltage is within the range included between a first voltage Vb and a second voltage Vc. Outside this range, the microconverters C limit the power transmitted from the photovoltaic modules PV to the DC bus BUS. Below a low threshold voltage Va and above a high threshold voltage Vd, the microconverters are placed in standby mode, stop the conversion and therefore stop the injecting of power from the photovoltaic modules PV to the DC bus BUS. The above voltages satisfy the following relationship: $0<Va<Vm<Vb<Vc<Vd$.

On the other hand, the DC bus manager MNG is equipped with a power supply connected to the network R. Optionally, there is furthermore provided an internal astronomical clock, not represented, enabling it to start the photovoltaic power production system only during daylight hours.

Preferably, the DC bus manager MNG also comprises a dedicated system for discharging the DC bus BUS. It can also comprise means for measuring the direct current injected into the inverter INV.

FIGS. 3A to 3D represent the various operating phases of the device according to the invention.

Figure 3A:
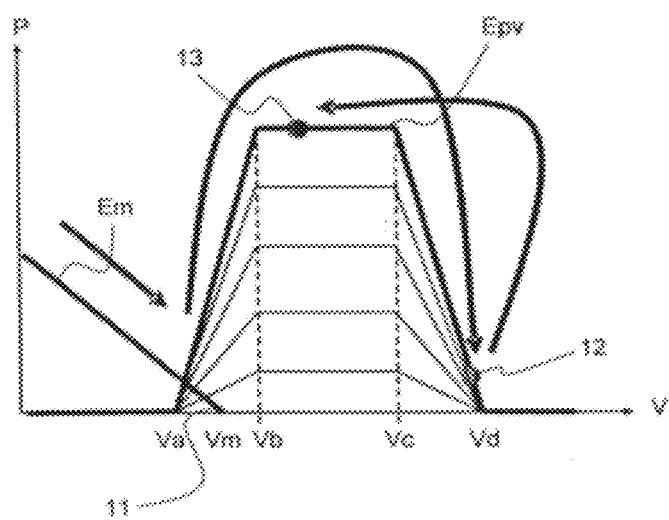
FIGS. 3A to 3D: diagrams based on the diagram of FIG. 2 and enabling the various operating phases of the device according to the invention to be described.

In the case of FIG. 3A, the plant is in startup phase, for example at daybreak. The DC bus manager MNG is powered up if the network R is available, for example upon a signal from the astronomical clock that may be contained in the device. The DC bus manager MNG then charges the DC bus BUS until the minimum voltage Vm is reached, corresponding to point 11 on FIG. 3A.

The voltage Vm is chosen to be less than the operating range of the inverter Vb-Vc, such that the inverter INV does not start up and does not discharge the DC bus BUS during this startup phase, which would be a constant consumption of power during the days without sufficient sunshine.

However, the minimum voltage Vm is within the startup range of the microconverters C, therefore greater than Va, since the said microconverters C, as soon as there is sunshine and as soon as the voltage of the bus is greater than the low threshold voltage Va, begin to inject power into the DC bus BUS in order to make its voltage level rise.

The inverter INV generally requires a startup time in the order of 30 seconds, which brings about an accumulation of energy in the DC bus BUS over this period. The voltage level of the DC bus BUS very quickly reaches a voltage greater than the second voltage Vc, the upper bound of the operating range of the inverter, thereby forcing the microconverters C to limit the injecting of power into the DC bus BUS. The voltage of the DC bus BUS is stabilized at the balance point for which the provision of power from the microconverters C is equal to the consumption of the inverter INV before it is coupled to the electrical distribution network R, corresponding to point 12 on FIG. 3A.

As soon as the inverter INV begins to supply the electrical distribution network R with alternative current, the voltage of the DC bus BUS decreases again and ends up being positioned in the plateau Vb-Vc, at a level at which the inverter injects a maximum of power into the network R, corresponding to point 13 in FIG. 3A.

Figure 3B:
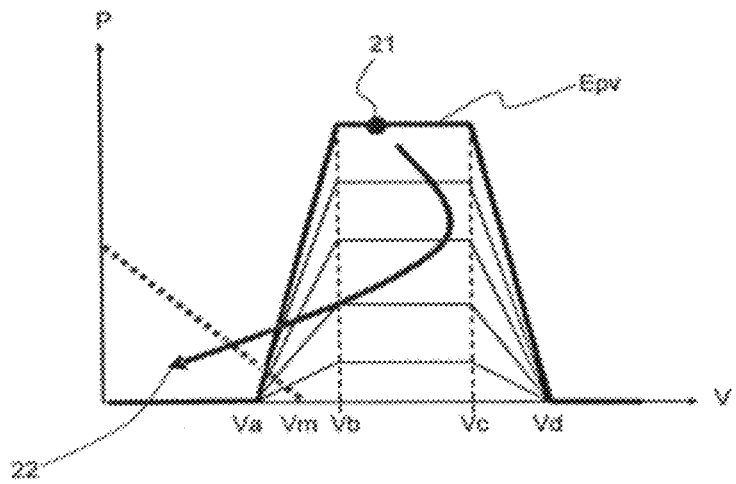

FIG. 3B represents the case in which the electrical distribution network R is cut off while the device is at the nominal operating point 21, for example in the case of an emergency intervention, preventing the inverter INV from injecting alternative current therein. In this case, on the one hand the inverter INV is disconnected from the network R, and on the other hand the DC bus manager MNG discharges the DC bus BUS. This discharge is typically carried out across an impedance, not represented, configured such that the voltage of the DC bus BUS falls below the low threshold voltage Va in a time less than that necessary to restart injection by the microconverters C. This duration is typically in the order of 2 seconds. This discharge has the effect of stopping all the microconverters C. The DC bus BUS then remains at a stop voltage, close to the open-circuit voltage Voc of the photovoltaic modules PV, typically in the order of 40 V, corresponding to point 22 in FIG. 3B. This state endures as long as the DC bus manager MNG is not supplied by the network R. When the network R returns, the plant switches back if necessary to the startup phase, if there is sufficient sunshine.

This operating mode, conveyed by FIG. 3B and made possible by the device according to the invention, exhibits the advantage of making the plant completely safe in the event of an emergency intervention, since no circuit is at a dangerous voltage while the electrical distribution network R is absent.

Figure 3C:
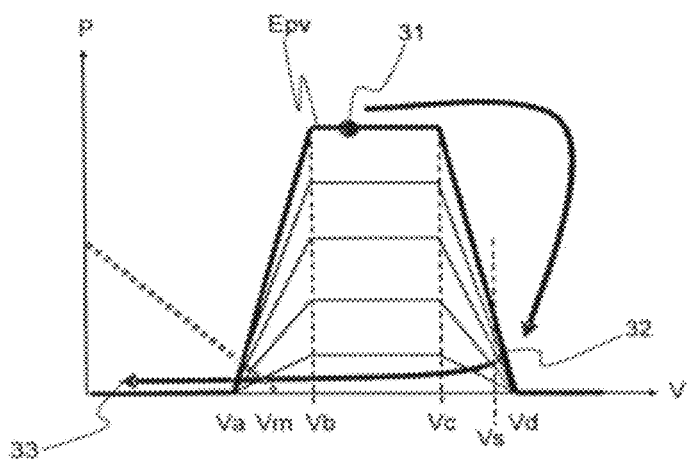

FIG. 3C represents an operating mode corresponding to the case in which the inverter INV is stopped due to an anomaly while it was at a nominal operating point 31.

This can occur when the inverter INV is faulty or when it detects a condition of decoupling from the network R, for example if the network frequency is outside its tolerance range or in the event of an isolation problem, etc. In that case, the inverter INV stops injecting alternative current into the network R. Consequently, the voltage of the DC bus BUS increases until it is stabilized, as in the case of startup, at the balance point corresponding to point 32 for which all the microconverters C supply only the power consumed by the inverter INV. In one preferred embodiment, the crossing of a voltage threshold Vs, slightly less than the high threshold voltage Vd, triggers a timeout in the DC bus manager MNG, allowing this case to be distinguished from that of startup. This timeout can typically be in the order of 2 minutes. At the end of this timeout, the DC bus manager MNG starts a procedure for discharging the DC bus BUS which stops the plant and holds the DC bus BUS at the open-circuit voltage Voc of the photovoltaic modules, corresponding to point 33.

According to the embodiment, the recharging of the DC bus BUS is suspended either until a manual restart, or until the end of a timeout in the order of a few minutes, typically around 15 minutes. The recharging of the DC bus BUS brings about either the startup procedure described in FIG. 3A if the inverter INV is in a position to recommence the injecting of alternative current into the network R, or a procedure to completely stop the plant in the event of a confirmed anomaly preventing the inverter INV from injecting alternative current into the network R.

Optionally, in the case of a risk of not knowing how to differentiate between a rise in voltage linked to an excess of power injected into the inverter INV and a stopping of the inverter INV, the device according to the invention can provide means for measuring the power injected into the DC bus BUS by the microconverters C via a current measurement in the DC bus manager MNG. This then requires the DC bus manager MNG to be wired in series as represented in FIG. 1B, the DC bus BUS passing through the DC bus manager MNG.

Figure 3D:
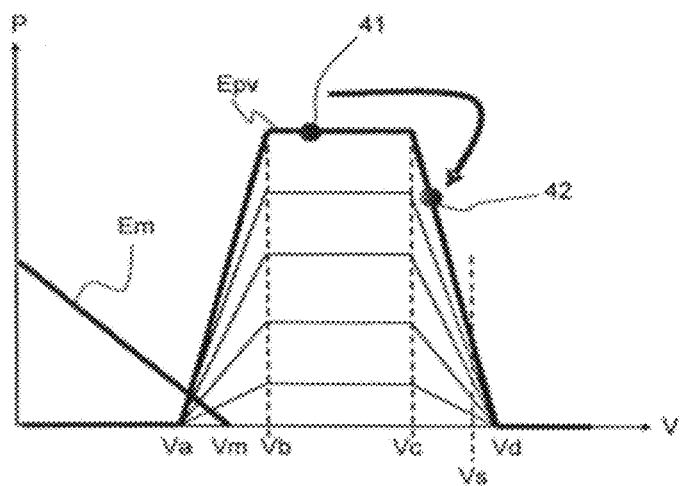

FIG. 3D represents the operation of the device according to the invention in the event of an overcharging of the inverter INV arising while the device is at a nominal operating point 41.

This occurs in the case when the power delivered by all the microconverters C exceeds that admissible by the inverter INV. The voltage of the DC bus BUS then increases until the second voltage Vc, which is the upper bound of the nominal operating range Vb-Vc, is exceeded. Following the profile of the diagram of FIG. 3D, each microconverter C then reduces its production and the system stabilizes on the segment between the second voltage Vc and the high threshold voltage Vd, corresponding to point 42 in FIG. 3D, for as long as the overcharge condition lasts. This voltage level at point 42 is sufficiently away from the voltage threshold Vs, meaning that the DC bus manager MNG does not start the procedure for discharging the DC bus BUS.

Lastly, in the event of one or all of the microconverters C being disconnected, startup of the power conversion is not possible, and therefore the DC bus BUS remains at a voltage level equal to the highest of the open-circuit voltages of photovoltaic modules PV, i.e. a value in the order of 40 V.

When disconnection of one or more microconverters C occurs during operation, i.e. while the DC bus BUS is charged, then each microconverter C detects a rise in voltage at its output and the cancellation of the output current. Next the microconverters C stop the power conversion and their output voltage drops. The voltage of the DC bus BUS then stabilizes at the open-circuit voltage Voc of the photovoltaic modules PV.

In all the cases, the microconverters C then remain in a standby state, supplied by the photovoltaic modules PV, and ready to restart as soon as the voltage of the DC bus BUS next exceeds the level of the low threshold voltage Va.

In all the operating modes described above, each item of the system is independent in order to determine which behaviour it must exhibit, whether this regards the microconverters C, the DC bus manager MNG or the inverter INV, INV'. No additional communication device is required. Furthermore, the device according to the invention is permanently in the safest possible configuration, in particular in the case of an emergency stoppage of the plant.

In summary, the device according to the invention allows each microconverter C that it contains to define its running mode only by analyzing the voltage level of the DC bus BUS, without resorting to a system for communicating with the inverter INV, INV' or the DC bus manager MNG. The voltage measurement of the DC bus BUS, which is already carried out in order to allow the operation of the inverter INV, INV' in this type of plant, does not require additional specific components to be developed. The number of components critical for the correct operation of the device is reduced and consequently its reliability is increased.

The preferred embodiment, described above, includes photovoltaic panels but, alternatively, the DC bus BUS can be supplied with power by other types of electrical generators such as wind or hydraulic generators connected to the DC bus BUS via suitable converters.

Advantageously, the system according to the invention can be connected to a charging terminal intended to recharge the batteries of an electric vehicle.

The invention claimed is:

1. A system for controlling photovoltaic electricity production equipment comprising:
   at least one DC/DC microconverter connected to a DC bus and connected to a photovoltaic module;
   an inverter that converts the direct current from the DC bus into alternative current transferred to an electrical distribution network,
   wherein
   the at least one microconverter includes circuitry configured to independently determine the level of power to inject into the DC bus as a function of the voltage level of the said DC bus,
   the at least one microconverter
      stops the injecting of power from the photovoltaic modules into the DC bus when the voltage of the DC bus is less than a low threshold voltage Va, and
      stops the injecting of power from the photovoltaic modules into the DC bus when the voltage of the DC bus is greater than a high threshold voltage Vd, and
   the system additionally comprises circuitry configured to manage the DC bus and the circuitry configured to manage the DC bus is further configured to inject power from a power supply connected to the electrical distribution network into the DC bus when the voltage of the said DC bus is less than a minimum voltage Vm until the said minimum voltage Vm is reached,
   wherein the at least one microconverter is configured to:
   inject a maximum of power from the photovoltaic modules into the DC bus when the voltage of the DC bus is between a first voltage Vb and a second voltage Vc, and
   stop the injecting of power from the photovoltaic modules into the DC bus when the voltage of the DC bus (BUS) is less than a low threshold voltage Va or greater than a high threshold voltage Vd, where $0<Va<Vm<Vb<Vc<Vd$.

2. The system according to claim 1, wherein
   the circuitry configured to manage the DC bus is further configured, when the voltage of the DC bus is greater than a voltage threshold Vs, to set the voltage threshold Vs as greater than the second voltage Vc and less than the high threshold voltage Vd, and
   the circuitry configured to manage the DC bus is further configured to trigger a timeout at least equal to twice the inverter startup time and, at the end of the said timeout, start a procedure for discharging the DC bus by a discharge system.

3. The system according to claim 2, wherein the circuitry configured to manage the DC bus comprises the discharge system for discharging the DC bus.

4. The system according to claim 1, wherein the circuitry configured to manage the DC bus is included in the inverter.

5. The system according to claim 1, wherein the circuitry configured to manage the DC bus is distinct from the inverter.

6. The system according to either claim 5, wherein the circuitry configured to manage the DC bus comprises an astronomical clock for starting the circuitry configured to manage the DC bus only during daylight hours.

7. The system according to claim 1, wherein the at least one microconverter is configured to automatically enter a standby mode when the voltage of the DC bus is less than the low threshold voltage Va or greater than the high threshold voltage Vd.

8. A system for controlling photovoltaic electricity production equipment comprising:
   at least one DC/DC microconverter connected to a DC bus and connected to a photovoltaic module;
   an inverter that converts the direct current from the DC bus into alternative current transferred to an electrical distribution network,
   wherein
   the at least one microconverter includes circuitry configured to independently determine the level of power to inject into the DC bus as a function of the voltage level of the said DC bus,
   the at least one microconverter stops the injecting of power from the photovoltaic modules into the DC bus when the voltage of the DC bus is less than a low threshold voltage Va or greater than a high threshold voltage Vd, and
   the system additionally comprises circuitry configured to manage the DC bus and the circuitry configured to manage the DC bus is further configured to inject power from a power supply connected to the electrical distribution network into the DC bus when the voltage of the said DC bus is less than a minimum voltage Vm until the said minimum voltage Vm is reached,
   wherein
   the circuitry configured to manage the DC bus is further configured, when the voltage of the DC bus is greater than a voltage threshold Vs, to set the voltage threshold Vs as greater than a second voltage Vc and less than the high threshold voltage Vd, and
   the circuitry configured to manage the DC bus is further configured to trigger a timeout at least equal to twice the inverter startup time and, at the end of the said timeout, start a procedure for discharging the DC bus by a discharge system.

\* \* \* \* \*